(12) United States Patent
Chen et al.

(10) Patent No.: US 7,185,165 B2
(45) Date of Patent: *Feb. 27, 2007

(54) INVARIANT MEMORY PAGE POOL AND IMPLEMENTATION THEREOF

(75) Inventors: Tianlong Chen, Gaithersburg, MD (US); Yinong Wei, Fairfax, VA (US); Yingbin Wang, Falls Church, VA (US)

(73) Assignee: Intelitrac, Inc., Gaithersburg, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/167,769

(22) Filed: Jun. 27, 2005

(65) Prior Publication Data
US 2005/0283584 A1    Dec. 22, 2005

Related U.S. Application Data

(63) Continuation of application No. 10/425,730, filed on Apr. 30, 2003, now Pat. No. 6,912,641.

(51) Int. Cl.
*G06F 12/06*    (2006.01)
(52) U.S. Cl. ...................................... 711/170
(58) Field of Classification Search ................. 711/170
See application file for complete search history.

(56) References Cited

U.S. PATENT DOCUMENTS 6,192,391 B1*  2/2001  Ohtani ...................... 709/201
6,665,788 B1* 12/2003  Hughes ..................... 711/206

OTHER PUBLICATIONS

Goodheart et al., "The Magic Garden Explained: The Internals of UNIX System V Release 4", 1994, p. 80-83.*
TimesTen Performance Software White Paper, "Architectured for Real-Time Data Management-Times Ten's Core In-Memory Database Technology", TimesTen Performance Software 2001.*

* cited by examiner

*Primary Examiner*—Kevin L. Ellis
(74) *Attorney, Agent, or Firm*—24IP Law Group; Timothy R. DeWitt

(57) ABSTRACT

A distributed memory computing environment is structured with an invariant memory page pool. The environment includes a device, a memory, a hard disk, and an operating system running on the device. A device ID lookup table and a Memory Block ID Lookup Table are stored in memory. Copies of memory pages and their look up tables are stored on the hard disk. If the operating system is shut down, at subsequent system start-up, memory is divided according to the same divisions seen on the memory page copies saved in configuration files.

63 Claims, 6 Drawing Sheets

INVARIANT MEMORY PAGE POOL AND IMPLEMENTATION THEREOF

CROSS-REFERENCE TO RELATED APPLICATIONS

The present application is a continuation of U.S. patent application Ser. No. 10/425,730 filed on Apr. 30, 2003, now U.S. Pat. No. 6,912,641 and claims the benefit of the filing date of that application.

Central Linked List Data Structure and Methods of Use; Filed Jul. 9, 2002, Inventor: Jonathan Vu.

Memory-Resident Database Management System and Implementation Thereof; Ser. No. 10/347,678; Filed on Jan. 22, 2003; Inventors: Tianlong Chen, Jonathan Vu.

Distributed Memory Computing Environment and Implementation Thereof; Ser. No. 10/347,677; Filed Jan. 22, 2003; Inventors: Tianlong Chen, Jonathan Vu, Yingbin Wang.

Single Computer Distributed Memory Computing Environment and Implementation Thereof; Filed on Apr. 30, 2003; Inventors: Tianlong Chen, Yingbin Wang, and Yinong Wei.

The above cross-referenced related applications are all hereby incorporated by reference herein in their entirety.

STATEMENT REGARDING FEDERALLY SPONSORED RESEARCH OR DEVELOPMENT

Not applicable.

BACKGROUND OF THE INVENTION

1. Field of the Invention

The present invention relates broadly to computer memory, and more specifically to a memory page pool architecture and method of use.

2. Description of the Related Art

In a computer, an Operating System (OS) manages the computer's hardware and software resources. When a computer is first turned on, a bootstrap loader is run which loads the operating system into memory, and allows it to run. The bootstrap loader runs various smaller programs, which set up the computer to run. One of the bootstrap loader's tasks at start up is to set up divisions of memory that hold the operating system and other applications. When the Operating System (OS) is run, the memory set up is done anew each time. It is never guaranteed that any application running with the operating system will access the same set of memory pages each time the computer is restarted or run on a different computer, even if the different computer has the same Operating System (OS). The bootstrap system also establishes data structures for flags, signals, and semaphores, for communicating between the computer's subsystems and applications.

In prior systems, if an application uses memory pages to build sophisticated data structures, the building process took a long amount of time. Further, rebuilding the data structure each subsequent time the application started took almost the same amount of time. What is needed is a way to rebuild these data structures in a time-saving and efficient manner.

SUMMARY OF THE INVENTION

The present invention has been made in view of the above circumstances and has as an aspect providing a method to configure and manage a pool of memory pages with a snapshot capability. The present invention has a further aspect of providing a snapshot with not only the data but also the structure in which data is constructed and managed. Still another aspect of the present invention is to provide a system and method of taking a snapshot of the memory pages after a data structure has been built and re-mapping the memory pages from the snapshot at the restarting time of the application instead of rebuilding the data structure.

Another aspect of the present invention is to provide a method and system for constructing and managing a multi-sized memory page pool. Still another aspect of the present invention is to provide a method of tracking memory mapping information. Yet another aspect of the present invention is to track and synchronize changed memory pages.

Still another aspect of the present invention is to provide a system and method of tracking security information on memory pages. Another aspect of the present invention is to provide a method of access control using security information tracked on memory pages.

In still another aspect of the present invention is a method of taking a snapshot of memory pages at a particular time.

A distributed memory computing environment is structured with an invariant memory page pool. The environment includes a device, a memory, a hard disk, and an operating system running on the device. A device ID lookup table and a Memory Block ID Lookup Table are stored in memory. Copies of memory pages and their look up tables are stored on the hard disk or other rewritable non-volatile storage media. If the operating system is shut down, at subsequent system start-up, memory is divided according to the same divisions seen on the memory page copies saved in configuration files.

Still other aspects, features, and advantages of the present invention are readily apparent from the following detailed description, simply by illustrating preferable embodiments and implementations. The present invention is also capable of other and different embodiments, and its several details can be modified in various respects, all without departing from the spirit and scope of the present invention. Accordingly, the drawings and descriptions are to be regarded as illustration in nature, and not as restrictive.

BRIEF DESCRIPTION OF THE DRAWINGS

The accompanying drawings, which are incorporated in and constitute a part of this specification illustrate some embodiments of the invention and, together with the description, serve to explain the objects, advantages, and principles of the invention. In the drawings.

DETAILED DESCRIPTION OF THE PREFERRED EMBODIMENTS

Figure 1:
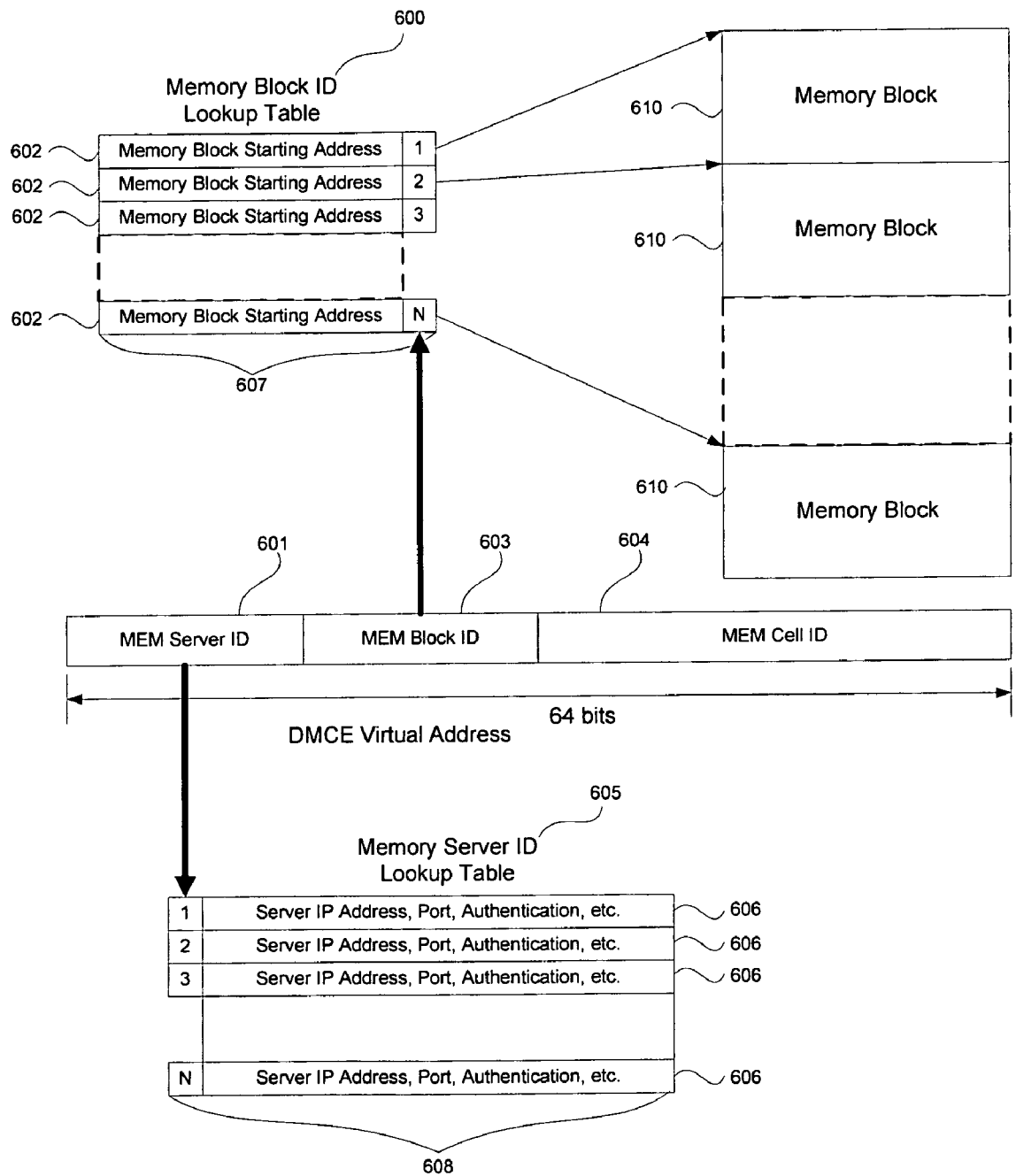
FIG. 1 illustrates a DMCE Virtual Address and conceptual block diagram of how a Memory Server ID and Memory Block ID are used in memory address mapping, in accordance with the present invention.

The present invention relates to application Ser. No. 10/347,677; for "Distributed Memory Computing Environment and Implementation Thereof"; Filed Jan. 22, 2003; Inventors: Tianlong Chen, Jonathan Vu, Yingbin Wang, and, more specifically, to the DMCE Virtual Address, which is used with the present invention. The DMCE Virtual Address is illustrated in FIG. 1. Referring to FIG. 1, the 64-bit DMCE Virtual Address includes a Memory Server ID 601, a Memory Block ID 603 and Memory Cell ID (also called Memory Offset ID) 604. The Memory Server ID is used to map to Server information 606 (including IP address, port, authentication etc.) from a Memory Server ID Lookup Table 605. The Memory Block ID 603 is used to map to Memory Block information 602 (including at least the starting address of the Memory Block) from a Memory Block ID Lookup Table 600. The actual address of a memory page in a memory block is the sum of the Memory Offset ID 604 and the starting address 602 of the memory block in which the memory page is located.

A memory page pool in accordance with the present invention is built upon the DMCE Virtual Address described above, to provide a transparent, snapshot of memory and diminish the time needed to re-build complex data structures. Since the information stored in a DMCE Virtual Address is relative information, one relies on two lookup tables 600, 605 and a summation to find the real address. If the DMCE Virtual Address is embedded as part of content in memory pages copied from server to server, the address can still be accessible providing that such two lookup tables, namely the Memory Block ID Lookup Table 600, and the Memory Server ID Lookup Table 605, are set accordingly.

Figure 2:
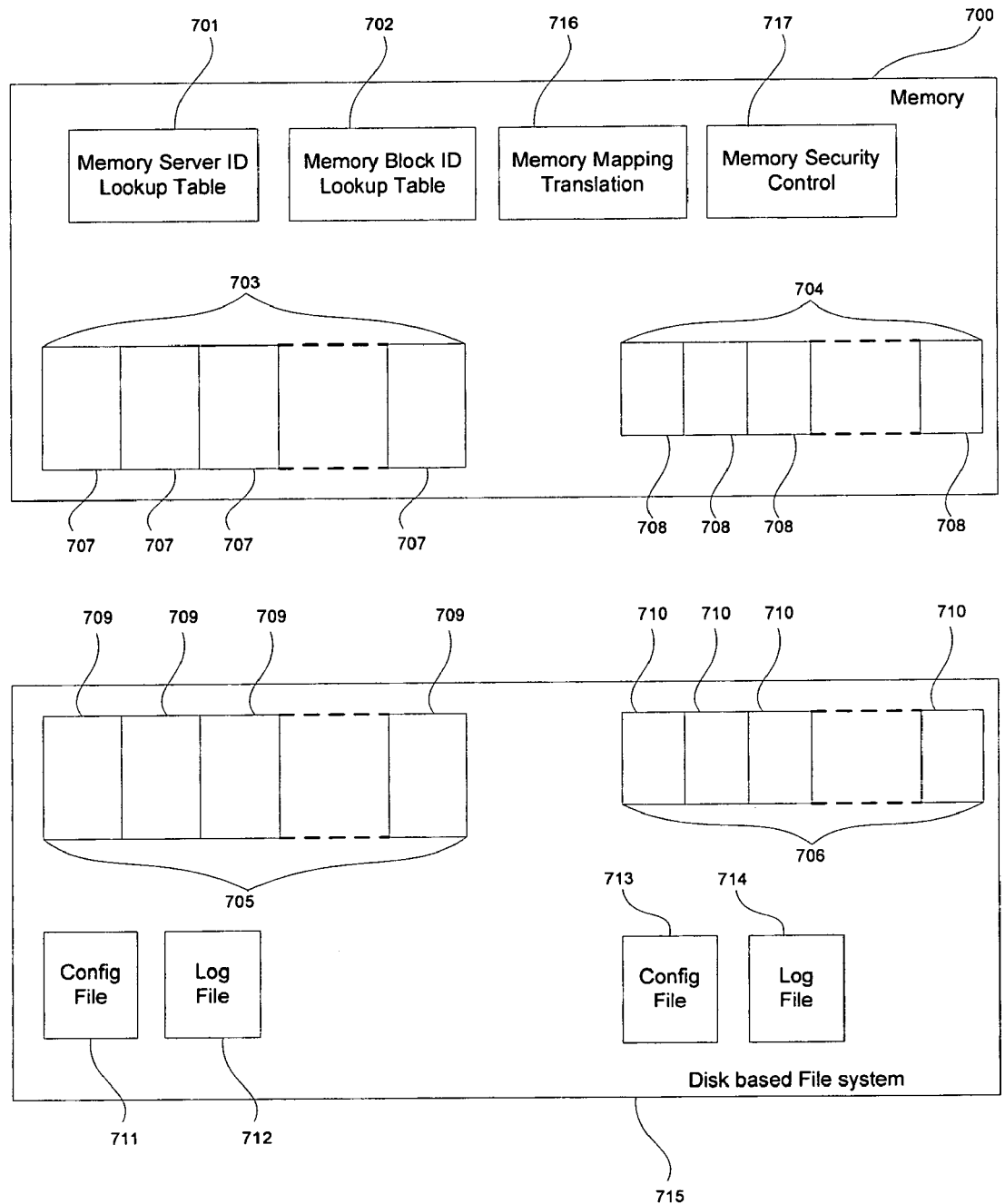
FIG. 2 illustrates a conceptual block diagram of a multiple-sized memory page pool with a disk-based backup file system in accordance with the present invention.

Referring to FIG. 2, there is illustrated a conceptual block diagram of memory page pool. Memory has been separated into memory blocks 703, 704. Each memory block 703, 704 is further separated into memory pages 707, 708, each with a desired, configurable page size. The memory page size of each page is the same within one memory block. Memory Page Pool Management (abbreviated as MPPM) manages data stored in two types of memory. One type of memory is volatile memory, referred to as memory side 700, which allows for fast data access. The second type of memory managed by MPPM is disk-based memory 715, referred to as disk side 715, which provides a reliable backup and recovery file system. The memory side 700 of MPPM includes Memory Server ID Lookup Table 701, Memory Block ID Lookup Table 702, Memory Mapping Translation Logic 716, and Memory Security Control Logic 717.

Still referring to FIG. 2, the disk side 715 of MPPM includes an optional memory mirror block file 705, 706, a configure file 711, 713 and a log file 712, 714, for each memory block 703, 704 on the memory side. Memory Mirror block file 705, configure file 711, and log file 712 correspond to memory block 703, and memory mirror block file 706, configure file 713, and log file 714 correspond to memory block 704. The disk side 715 of MPPM also includes a Server Configure File (not shown). It is possible to construct the present invention such that one memory-block-configure file is used for all memory blocks, i.e., 711 and 713 maybe the same file. And it is also possible to configure the present invention such that one memory-block-log file is used for all memory blocks, i.e., 712 and 714 may be the same file.

Still referring to FIG. 2, the Server Configure File 718 is a disk-based copy of the Memory Server ID Lookup Table 701, in which each table entry relates to one server including the information of Server ID, server IP address, communication port, authentication information and the directories where memory block configuration files 711, 713 and memory block files 705, 706 are located. It is possible for multiple table entries to refer to the same server.

Still referring to FIG. 2, the Memory Block ID Lookup Table 702 has every table entry referring to one memory block. It is possible for multiple entries to refer to the same one memory block. Each table entry at least has Memory Block ID and the memory starting address of the corresponding memory block used for DMCE Virtual Address. Memory Page Pool Management adds more information, as described below, to each entry to achieve a snapshot, security, and other functionality.

Figure 7:
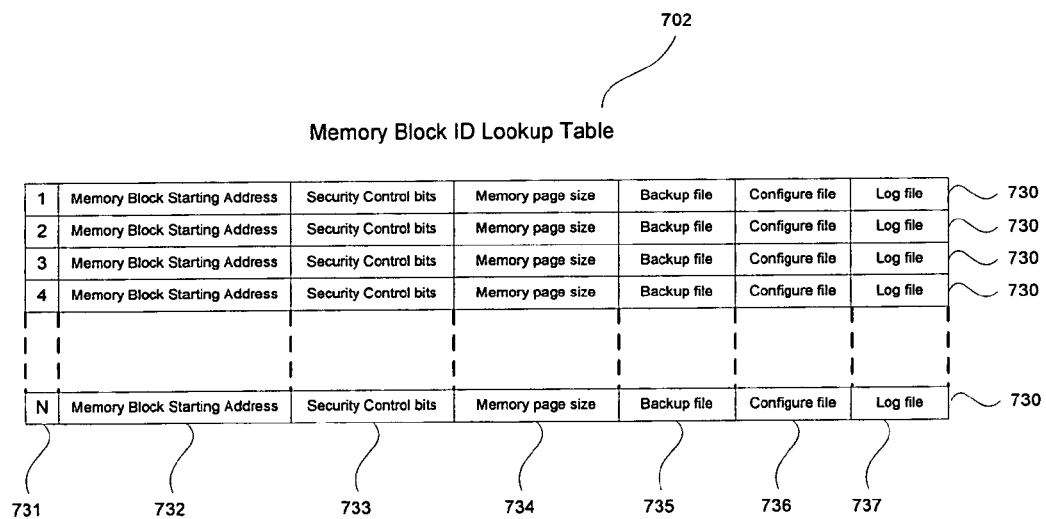
FIG. 7 illustrates a conceptual block diagram of a preferred embodiment of Memory Block ID Lookup Table in accordance with the present invention.

Referring to FIGS. 2 and 7, each table entry 730 in Memory Block ID Lookup Table 702 includes all information of a memory block, such as Memory Block ID 731, starting address of memory block 732, the size of the memory pages in this memory block 734, the file name 735 of associated backup file 705, 706, the file name 736 of associated configure file 711, 713, and optional security access control bits 733 for this memory block if security control is desired on the memory block level, the file name 737 of associated log file 712, 714, and the number of total memory pages (not shown in FIG. 7) may be included in a table entry 730. The memory-based Memory Block ID Lookup Table 702 also includes necessary run-time information (which is not kept in disk-based configure files 711, 713), such as the number of used pages, the number of unused pages, and, optionally, the memory pointers to memory blocks in order for fast access.

Still referring to FIG. 2, each memory block has one configure file 711, 713 that keeps the same information as in the memory-based Memory Block ID Lookup Table 702 for the corresponding memory block 703, 704. Such configure files 711, 713 are used with the Server Configure file (not shown) and existing log files to re-build an exact memory page pool as it was at the time of system restart or recovery. The log files 712, 714 are optional, as keeping and maintaining them can slow system performance. However, when kept and maintained, log files 712, 714 can be used at the system restarting or recovery time to find out whether system is previously shutdown normally or abnormally, and can be used to fix any inconsistency for abnormal shutdown, if any exists. For certain applications, especially high-performance applications, the log file option can be configured to off, or to log only low-volume critical information.

Another option for the logging 712, 714 is a memory-based option, further, described below.

Other information may be included in the Memory Block ID Lookup Table and its associated file-based configure files, such as Memory slave process ID in the application titled "Single Computer Distributed Memory Computing Environment and Implementation Thereof"; filed [date]; Inventors: Tianlong Chen, Yingbin Wang, and Yinong Wei; hereby incorporated by reference, in its entirety, herein.

Still referring to FIG. 2, each memory block 703, 704 has its own disk-based backup file 705, 706. The backup file 705 is associated with the memory block 703, and the backup file 706 is associated with the memory block 704. One memory block, may be the back up of another memory block, as long as they are configured with the same block size and same page size. The backup to memory is configurable, and may optionally be file-based or memory-based. The system may optionally be configured with no backup.

Referring to FIGS. 2 and 7, the "backup file" field 735 stores the backup option information for a memory block. If a backup file option is used, the "backup file" field 735 records a Server ID (which is looked up from Memory Server ID Table) and an absolute file name in that server with the given Server ID. If it is a memory block backup option, the "backup file" field 735 records a Server ID and a Memory Block ID to identify a memory block from a specified server. If the "backup file" field 735 is left blank, the option is no-backup.

Still referring to FIG. 2, each memory block has continuous, same-sized memory pages in order for easy memory management, e.g., of memory pages 707 in memory block 703 and memory pages 708 in memory block 704. Each memory page is identified within a memory block by a Memory Offset ID, which is its offset to the starting address of the memory block. Referring to FIG. 7, if memory page is, for example, size S, then the memory page 741 closest to the starting address 740 is of Memory Offset ID equal to 0, the memory page 742 next closest to the starting address is of Memory Offset ID equal to value S, the memory page 743 next to next closest to the starting address is of Memory Offset ID equal to value 2×S (2 times S), and so on and on. Therefore, the nth memory page is has a Memory Offset ID equal to the value n×S, i.e., n multiplied by S.

Still referring to FIG. 2, the configure files 711, 713 are the disk-based record of Memory Block ID Lookup Table, which is used for the purpose of backup and recovery. The Memory Server Configure file 718 and Memory Block configure files 711, 713 may be kept in one file. The information kept in the configure files 711, 713, 718 is normally not changed at system running time. When restarting the system, the configure files 711, 713, 718 are used to re-build the whole memory page pool exactly the same as it was at its previous running stage.

Still referring to FIG. 2, when backup file is used as backup option, backup files 705, 706 will keep exact record of their corresponding memory blocks 703, 704. One embodiment is to binary copy bit-by-bit from memory blocks 703, 704 to their corresponding backup files 705, 706. Alternatively, one can use certain compression algorithms to compress and copy from memory block to backup file in order to save disk space. However, compression algorithms tend to be computing intensive, and may slow down system performance. Regardless of how the back up file is made, each memory page 707 in a memory block 703 has one mirror copy 709 in the corresponding backup file 705. The relative offset of a memory page 707 in a memory block 703 is the same offset of its mirror copy 709 in its backup file 705. This mirroring scheme is also used in the process of mirror-copying from memory block to memory block, when the memory block backup option is used.

In order to keep the information stored in memory pages synchronized with the backup option (file or memory block), only changed memory pages are copied to their corresponding mirror copies in the backup option (file or memory block). Necessarily, though, when the backup options (files or memory blocks) are first created, all memory pages are mirror-copied.

Still referring to FIG. 2, in order to snapshot and remap the Memory Page Pool, some construction information for Memory Blocks and Memory Servers is kept in the configure files 711, 713, 718. The Memory Page Pool can have different sized page blocks. They are normally used for two purposes, one for client applications, and the other for internal use in Memory Page Pool. For easy description, the pages used for client applications are called Client Pages, and the pages used internally are called Management Pages. As expected, the majority of memory pages in the Memory Page Pool are Client Pages, and Client Pages are normally larger than Management Pages.

All the per-Client-Page construction links (between page to page, etc.) and information (such as security control bits) are kept in one or more memory blocks of Management Pages. All the construction links use the DMCE Virtual Address. Therefore by using the backup options (files or memory blocks) of those Management-Page Memory Blocks, the internal structure of Memory Page Pool is remembered, and backed-up like a snapshot, e.g., an exact replica of the Memory Page Pool at the time of shut down. Thus, memory can be restored whenever needed.

Client Page mirroring is similar to the Management Page mirroring. Client Pages are used by client applications to store data and data structures. All data and data structure links and pointers on Client Pages use the DMCE Virtual Address. Therefore, by using the backup options (files or memory blocks) of those Client-Page Memory Blocks, the data and data structures of client applications are copied and stored in their exact form at the time of shut down, like a snapshot. Thus, they are quickly retrieved and restored whenever necessary.

An Application Programming Interface (API) as part of overall DMCE Extended Memory Management is provided for a client application to access the mapped data and data structures stored on Client Pages, when the Memory Page Pool is linked with client application directly. If the DMCE Extended Memory Management is embedded into the underlying Operating System, then accessing those pages may be handled transparently by a modified memory management unit of the underlying Operating System. These systems and methods of adapting the operating system to work with DMCE are described in application Ser. No. 10/347,677; for "Distributed Memory Computing Environment and Implementation Thereof;" Filed Jan. 22, 2003; Inventors: Tianlong Chen, Jonathan Vu, Yingbin Wang.

Figure 3:
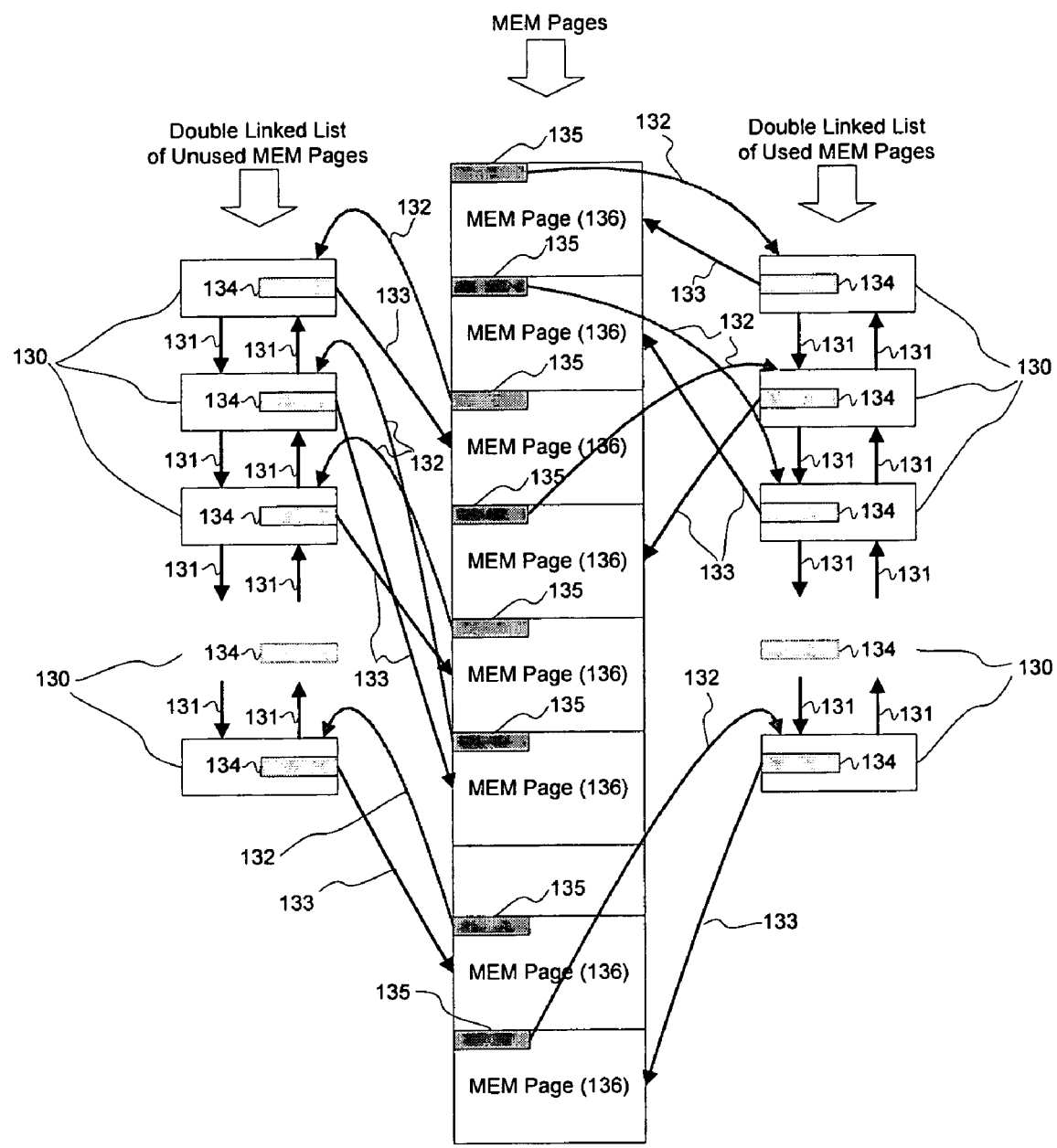
FIG. 3 illustrates a conceptual block diagram of a linked-list memory page pool structure, in accordance with the present invention.
Figure 4:
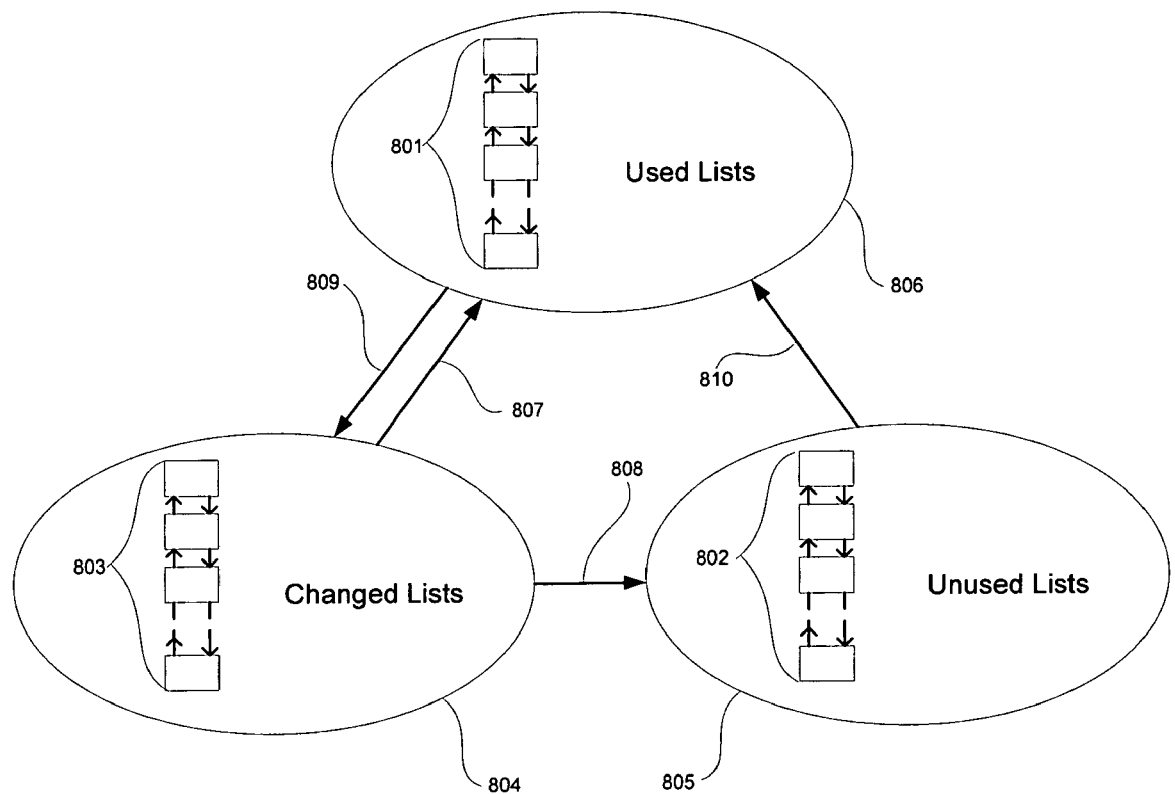
FIG. 4 illustrates a conceptual block diagram of a preferred embodiment of tracking transferring states for memory pages in accordance with the present invention.

Referring to FIGS. 3 and 4, a conceptual block diagram of an embodiment of a memory page handling structure inside a Memory Page Pool is illustrated. The diagram and description of FIG. 3 is disclosed in patent application Ser. No. 10/347,678; for "Memory-Resident Database Management System and Implementation Thereof" Filed on Jan. 22, 2003; Inventors: Tianlong Chen, Jonathan Vu.

The double-linked structure shown in FIGS. 3 and 4. is intended to handle fast, re-usable client pages without experiencing memory fragmentation problems often found in regular memory management systems. It will be appreciated by one skilled in the art that re-usable client pages may be handled in a variety of ways. A preferred method of handling re-useable client pages is further described below.

Figure 8:
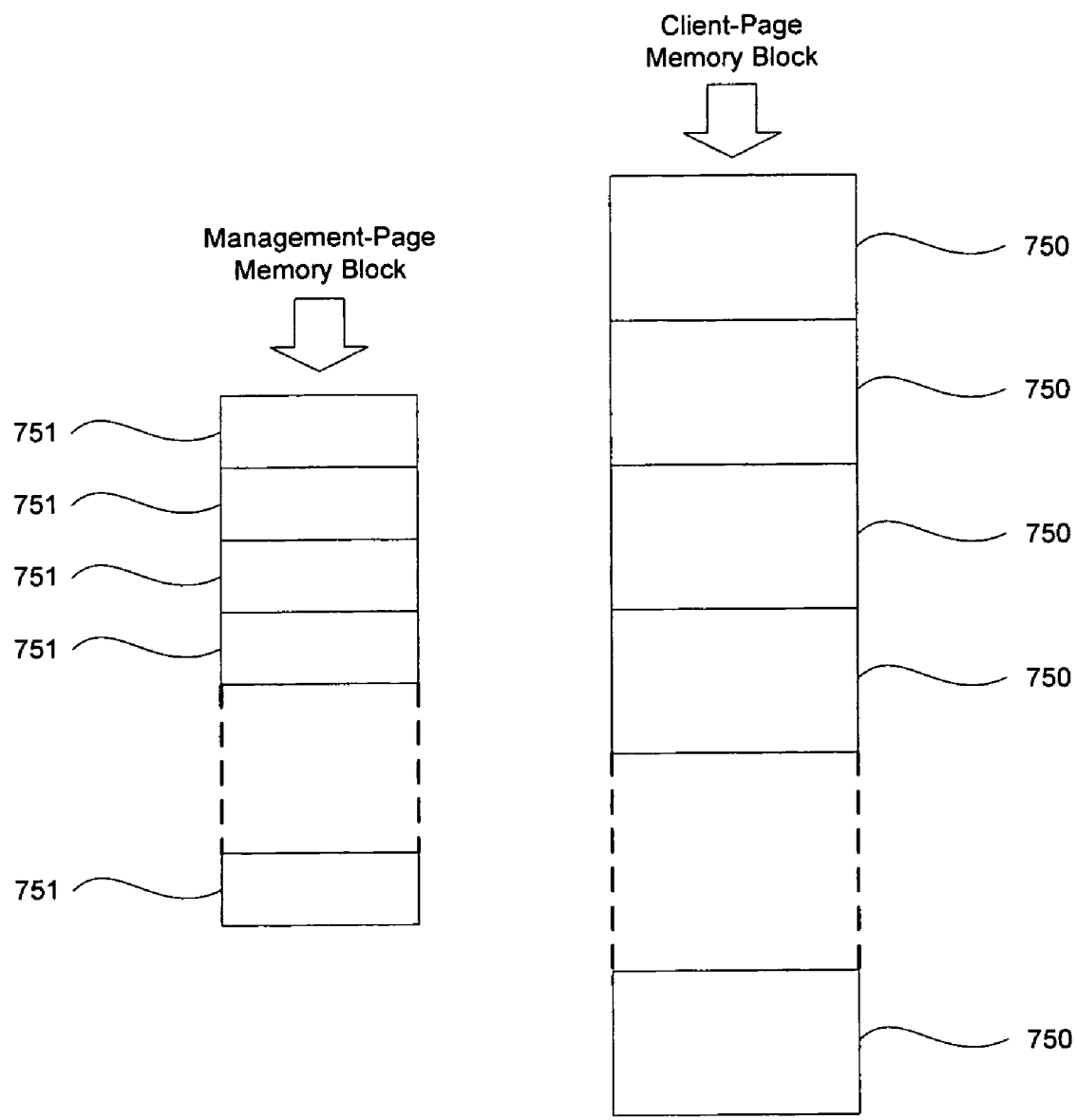
FIG. 8 illustrates a conceptual block diagram of a preferred embodiment of Memory Page handling structure in accordance with the present invention.

Referring to FIGS. 3 and 4, MEM Pages 136 are made from Client Pages. Link nodes 130 are made from Management Pages, where each MEM Page 136 has an associated link node. The starting point of this construction is shown on FIG. 8 in which one Client-Page Memory Block and one Management-Page Memory Block are allocated, and so are their associated Memory Block ID entries in Memory Block ID Lookup Table configure files and log files, as described above. Both Memory Blocks have the same number of memory pages. However, the size of the Client Page 750 may be different than that of Management Page 751. The 1st memory page in Client-Page Memory Block is associated with the 1st memory page in Management-Page Memory Block, and so on.

Referring to FIG. 3, MEM Page 136 keeps 132 a pointer 135 to its associated link node 130, and the link node 130 keeps 133 a pointer 134 to its associated MEM Page 136. Therefore, MEM Page 136 and its associated link node 130 can cross reference to each other. The link nodes 130 are double-linked 131 together. One double-linked list keeps tracks all used pages 140. The other double-linked list tracks all unused pages 150. At the fresh beginning of system (system start up), all MEM Pages are linked under the Unused List 150. When MEM Pages are allocated by client applications, the allocated pages are moved from the Unused List 150 to Used List 140. And when application frees allocated memory pages, the freed pages are moved from Used List 140 to Unused List 150.

There are several ways to track changed pages for back-up. One is to create a third double-linked list as shown in FIG. 4. With the third double-linked list, Client Pages may be in three stages, Unused 805, Used 806 (with no change, or change has been updated) and Changed 804. When an application requests new pages, allocated pages are moved 810 from the Unused List 805 to the Used List 806. When pages are changed, the changed pages are moved 809 from the Used List 806 to the Changed List 804. After changed pages are backed-up, they are moved 807 from the Changed List 804 to the Used List 806, if the change is not freeing the pages. Pages are moved 808 from the Changed List 804 to the Unused List 805 if the change is made to free the pages. One or more threads (called backup threads), normally running as background threads and at low priority (configurable), run in the system to check Changed Lists 804 and to do the backup work.

Figure 5:
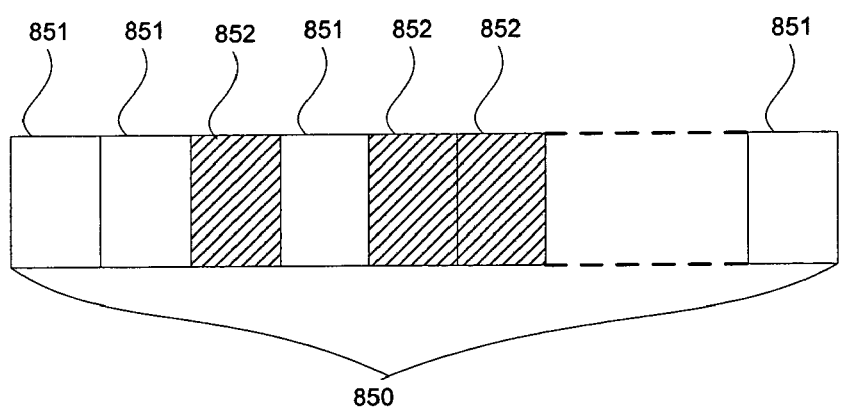
FIG. 5 illustrates an embodiment of tracking transferring states for memory pages in accordance with the present invention.
Figure 6:
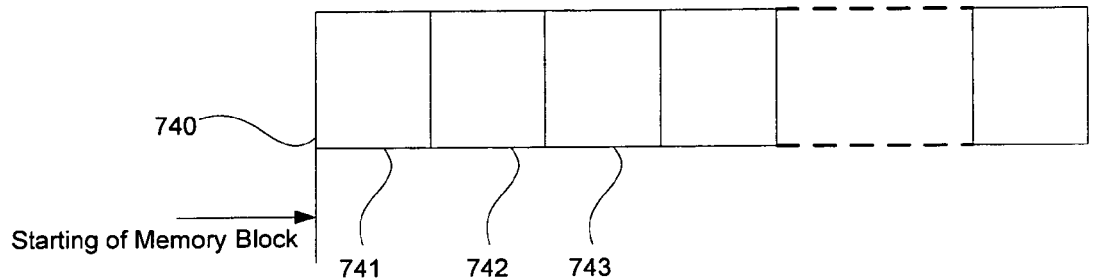
FIG. 6 illustrates a conceptual block diagram of a memory block of same-sized memory pages in accordance with the present invention.

Referring to FIG. 5, another way to track changed pages for back-up is to keep a record for each page indicating whether it is changed, where pages 851 are not changed, and pages 852 are changed. When tracking changes in this manner, the backup threads will loop through memory pages for changed pages and synchronize them with backup options (file or memory blocks).

The above two changed-page tracking methods are more preferable in different circumstances. Note that only memory blocks with memory pages that can be changed at run time are constantly checked by the backup threads. Both Client-Page Memory Block and Management-Page Memory Block can be marked as no change. The memory blocks with no-change mark are backed-up only once and will not be checked any more by the backup threads.

In order to provide fast logging capability for backup and recovery, the Memory pages with disk-based or memory-block backup in the Memory Page Pool can be used. First, one or more Management-Page Memory Blocks with disk-based file backup are allocated. Then, log information is put in the memory pages, relying on the Memory Blocks' backup option to reliably log the memory page transactions.

Referring to FIGS. 3 and 7, if per-memory-page security control is desired, security control bits are either stored in MEM pages 136 or their associated link nodes 130. The number of bits depends on how complicated a security control is needed. Then, each request for accessing the memory pages with security control requires security bits from the requesting applications.

Another system and method of handling memory pages is a variation of double-linked list of FIG. 3. The variation is done by removing the link 135 from MEM Page 136 to its associated link node 130, and not storing management information is stored in MEM Pages 136. Security bits and, optionally, a page-changed mark are all stored in the link nodes. This way, there are no cross-references between MEM Pages 136 and their associated link nodes 130. Thus, each MEM Page 136 and its link node 130 are always handled together. This increases the complexity of other parts of EMMU, such as the DMCE Memory Cache which is disclosed in Patent Application "Single Computer Distributed Memory Computing Environment and Implementation Thereof" mentioned in the CROSS-REFERENCE section above. The merit of this handling structure is that the application can write continuous memory pages at one time, whereas the system and method of handling memory pages as shown in FIG. 3, does not allow for continuous page writing. Otherwise, the link pointer from MEM Page 136 to its associated link node 130 would be corrupted. Removing the link is preferable for those applications in which data is loaded at the beginning, and seldom or never updated.

In various Distributed Memory Computing Environment architectures, the Memory Server ID may be called a Device ID. In such cases, the Memory Server ID Lookup Table is also referred to as a Memory Device ID Lookup Table.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A method for implementing a computing environment on a device, said device having a memory and an operating system running thereon, and said memory having a memory block, and said memory having a starting address, comprising the steps of:

storing a memory device ID lookup table in said memory, said memory device ID lookup table comprising a memory device entry comprising a device ID and identification information for said device; and storing a memory block ID lookup table in said memory comprising a memory-block entry corresponding to said memory block; and storing a system configuration file in said memory.

2. A method for implementing a computing environment according to claim 1 wherein said memory-block entry comprises a memory block ID and said staffing address of said memory block.

3. A method for implementing a computing environment according to claim 1 wherein said memory block further comprises at least one memory page.

4. A method for implementing a computing environment according to claim 3 wherein said memory page further comprises a memory page starting address calculated from an offset from said memory block starting address.

5. A method for implementing a computing environment according to claim 1 wherein said identification information of said device comprises a network IP address and a communication port of said device.

6. A method for implementing a computing environment according to claim 5 wherein said identification information of said device further comprises authentication information for communication to said device.

7. A method for implementing a computing environment according to claim 3 wherein an offset of said memory page to the said starting address of said memory block is an offset ID of said memory page.

8. A method for implementing a computing environment according to claim 1 further comprises steps of providing a backup option system for said memory block.

9. A method for implementing a computing environment according to claim 8 said backup option system of said memory block comprises a disk-based file in said device; and said memory-block entry for said memory block in said memory block ID lookup table comprises a representation for said disk-based file.

10. A method for implementing a computing environment according to claim 9 said disk-based file further comprises a mirror copy of said memory page in said memory block, wherein said mirror copy is copied to the said disk-based file.

11. A method for implementing a computing environment according to claim 10 wherein changes to said memory page in said memory block are copied to said mirror copy of said memory page in said disk-based file.

12. A method for implementing a computing environment according to claim 8 wherein said backup option system further comprises a first memory block having a first size that is configurable and a second memory block having a second size that is configurable, and said second size is equal to or larger than said first size, and said memory-block entry for said first memory block in said memory block ID lookup table further comprises a representation for said second memory block.

13. A method for implementing a computing environment according to claim 12 wherein said second memory block comprises a mirror copy of said first memory block.

14. A method for implementing a computing environment according to claim 13 wherein changes to said first memory page in said first memory block are copied to said second memory page in said second memory block, and said second memory page is a mirror copy of the said first memory page.

15. A method for implementing a computing environment according to claim 11 wherein said being copied is a compressed copying process.

16. A method for implementing a computing environment according to claim 14 wherein said being copied is a compressed copying process.

17. A method for implementing a computing environment according to claim 1 wherein said memory-block entry further stores a representation of said backup option system for said memory block in said memory block ID lookup table.

18. A method for implementing a computing environment according to claim 17 wherein said representation for said backup option system in said memory-block entry is left blank.

19. A method for implementing a computing environment according to claim 1 wherein said memory-block entry further comprises the size of the memory pages in said memory block.

20. A method for implementing a computing environment according to claim 1 wherein said memory-block entry in said memory block ID lookup comprises security control information for said memory block; and said security information comprises at least access authorization to said memory block.

21. A method for implementing a computing environment according to claim 1 wherein security control information with at least access authorization to said memory page of said memory block is stored in said memory.

22. A method for implementing a computing environment according to claim 1 wherein said system configuration file comprises at least configuration information of said device and said memory block.

23. A method for implementing a computing environment according to claim 1 wherein a DMCE Virtual Address is used to identify a memory address or a memory address pointer in said memory block.

24. A method for implementing a computing environment according to claim 1 further comprises steps of providing a disk-based memory-block configuration file for said memory block ID lookup table; and said disk-based memory-block configuration file comprises the information stored in said memory block ID lookup table.

25. A method for implementing a computing environment according to claim 1 further comprises steps of providing a disk-based device configuration file for said memory device ID lookup table; and said disk-based device configuration file comprises the information stored in said memory device ID lookup table.

26. A method for implementing a computing environment according to claim 1 further comprises steps of providing a disk-based system configuration file for said system configuration file in said memory; and said disk-based system configuration file comprises the information stored in said system configuration file in said memory.

27. A method for implementing a computing environment according to claim 1 further comprises steps of restoring said computing environment based on said disk-based system configuration file, said disk-based device configuration file and said disk-based memory-block configuration file at the said computing environment restarting time.

28. A method for implementing a computing environment according to claim 11 wherein said changes are logged in a memory-block log file.

29. A method for implementing a computing environment according to claim 14 wherein said changes are logged in a memory-block log file.

30. A method for implementing a computing environment according to claim 27 wherein a said memory page in a said memory block can be restored from its mirror copy of said disk-based file.

31. A method for implementing a computing environment according to claim 1 wherein said identification information comprises communication information to communicate with said device.

32. A method for implementing a computing environment according to claim 27 wherein the said restoring further comprises steps of restoring a said memory block from its corresponding said backup option system.

33. A method for implementing a computing environment according to claim 32 wherein said memory block is restored from its disk-based backup option system.

34. A method for implementing a computing environment according to claim 32 wherein said memory block is restored from its backup option system with a second memory block.

35. A computing system comprising:
a device having an operating system running thereon;
a memory;
a memory device ID lookup table stored in said memory, said memory device ID lookup table comprising a memory device entry comprising a device ID and identification information for said device;
a memory block in said memory, said memory block having a starting address;
a memory block ID lookup table in said memory comprising a memory block entry corresponding to said memory block; and
a system configure file stored in said memory.

36. A computing system according to claim 35 wherein said memory block entry comprises a memory block ID and said starting address of said memory block.

37. A computing system according to claim 35 wherein said memory block further comprises at least one memory page.

38. A computing system according to claim 35 wherein said memory page further comprises a memory page starting address calculated from an offset from said memory block starting address.

39. A computing system according to claim 35 wherein the said identification information of said device comprises a network IP address and a communication port of said device.

40. A computing system according to claim 35 wherein said identification information of said device comprises communication information to communicate to said device.

41. A computing system according to claim 35 wherein said identification information of said device comprises authentication information for communication to said device.

42. A computing system according to claim 35 wherein an offset of said memory page to the said staffing address of said memory block is an offset ID.

43. A computing system according to claim 35 wherein said memory block further comprises a backup option system.

44. A computing system according to claim 43 wherein said backup option system of said memory block comprises a disk-based file in said device; and said memory-block entry for said memory block in said memory block ID lookup table comprises a representation for said disk-based file.

45. A computing system according to claim 44 wherein said disk-based file further comprises a mirror copy of said memory page in said memory block, wherein said mirror copy is copied to said disk-based file.

46. A computing system according to claim 45 where changes to said memory page in said memory block are copied to said mirror copy of said memory page in said disk-based file.

47. A computing system according to claim 43 wherein said backup option of said memory block comprises a first memory block having a first size that is configurable and a second memory block having a second size that is configurable, and said second size is equal to or larger than said first size, and said memory-block entry for said first memory block in said memory block ID lookup table further comprises a representation for said second memory block.

48. A computing system according to claim 47 wherein said second memory block comprises a mirror copy of said first memory block.

49. A computing system according to claim 48 wherein changes to said first memory page in said first memory block are copied to said second memory page in said second memory block, and said second memory page is a mirror copy of the said first memory page.

50. A computing system according to claim 45 wherein said being copied is a compressed copying process.

51. A computing system according to claim 49 wherein said being copied is a compressed copying process.

52. A computing system according to claim 38 wherein said memory-block entry further comprises a representation for a backup option system for said memory block in said memory block ID lookup table.

53. A computing system according to claim 52 wherein said representation for said backup option system in said memory-block entry is left blank.

54. A computing system according to claim 37 wherein said memory-block entry further comprises the size of the memory pages in said memory block.

55. A computing system according to claim 38 wherein said memory-block entry in said memory block ID lookup table comprises security control information for said memory block; said security control information comprising at least access authorization to said memory block.

56. A computing system according to claim 38 wherein said system configuration file comprises at least configuration information of said device and said memory block.

57. A computing system according to claim 38 further comprises a log file for tracking memory page change information of said memory block; and said memory-block entry in said memory block ID lookup table further comprises a representation for said log file.

58. A computing system according to claim 38 a DMCE Virtual Address is further used in said memory block to identify a memory address or a memory address pointer.

59. A computing system according to claim 58 wherein said device ID is used as Memory Server ID in said DMCE Virtual Address, and said memory-block ID is used as Memory Block ID in said DMCE Virtual Address, and the offset from the said starting address of a said memory block is used as Memory Cell ID in said DMCE Virtual Address for said memory address or said memory address pointer.

60. A computing system according to claim 38 further comprises a disk-based memory-block configuration file for said memory block ID lookup table; and said disk-based memory-block configuration file comprises a representation to the information stored in said memory block ID lookup table.

61. A computing system according to claim 38 further comprises a disk-based device configuration file for said device ID lookup table; and said disk-based device configuration file comprises a representation to the information stored in said device ID lookup table.

62. A computing system according to claim 38 further comprises a disk-based system configuration file for said system configuration file in said memory; and said disk-based system configuration file comprises a representation to the information stored in said system configuration file in said memory.

63. A computing system comprising:
a first device having an operating system running thereon;
a second device having an operating system running thereon;
said first device having a first memory; said second device having a second memory;
a first memory device ID lookup table stored in said first memory in said first device, said first memory device ID lookup table comprising a first memory device entry comprising a first device ID and identification information for said first device, and a second memory device entry comprising a second device ID and identification for said second device;

a second memory device ID lookup table stored in said second memory in said second device, said second device ID lookup table comprising a third memory device entry comprising a said first device ID and identification information for said first device, and a fourth memory device entry comprising a said second device ID and identification for said second device;

a first memory block in said first memory in said first device, a second memory block in said second memory in said second device; and said first memory block having a first starting address, said second memory block having a second starting address;

a first memory block ID lookup table in said first memory on said first device comprising a first memory-block entry corresponding to said first memory block; and a second memory block ID lookup table in said second memory on said second device comprising a second memory-block entry corresponding to said second memory block; and a first system configuration file stored in said first memory; a second system configuration file stored in said second memory.

* * * * *

UNITED STATES PATENT AND TRADEMARK OFFICE
CERTIFICATE OF CORRECTION

PATENT NO. : 7,185,165 B2
APPLICATION NO. : 11/167769
DATED : February 27, 2007
INVENTOR(S) : Chen et al.

It is certified that error appears in the above-identified patent and that said Letters Patent is hereby corrected as shown below:

Col. 8,
Line 55, change "staffing" to --starting--

Col. 11,
line 36, change "staffing" to --starting--

Signed and Sealed this

Eighth Day of May, 2007

JON W. DUDAS
*Director of the United States Patent and Trademark Office*